May 19, 1959 R. A. FLOWER 2,887,579
PULSE REPETITION FREQUENCY GENERATOR AND DRIVER
Filed Nov. 19, 1953 2 Sheets-Sheet 1
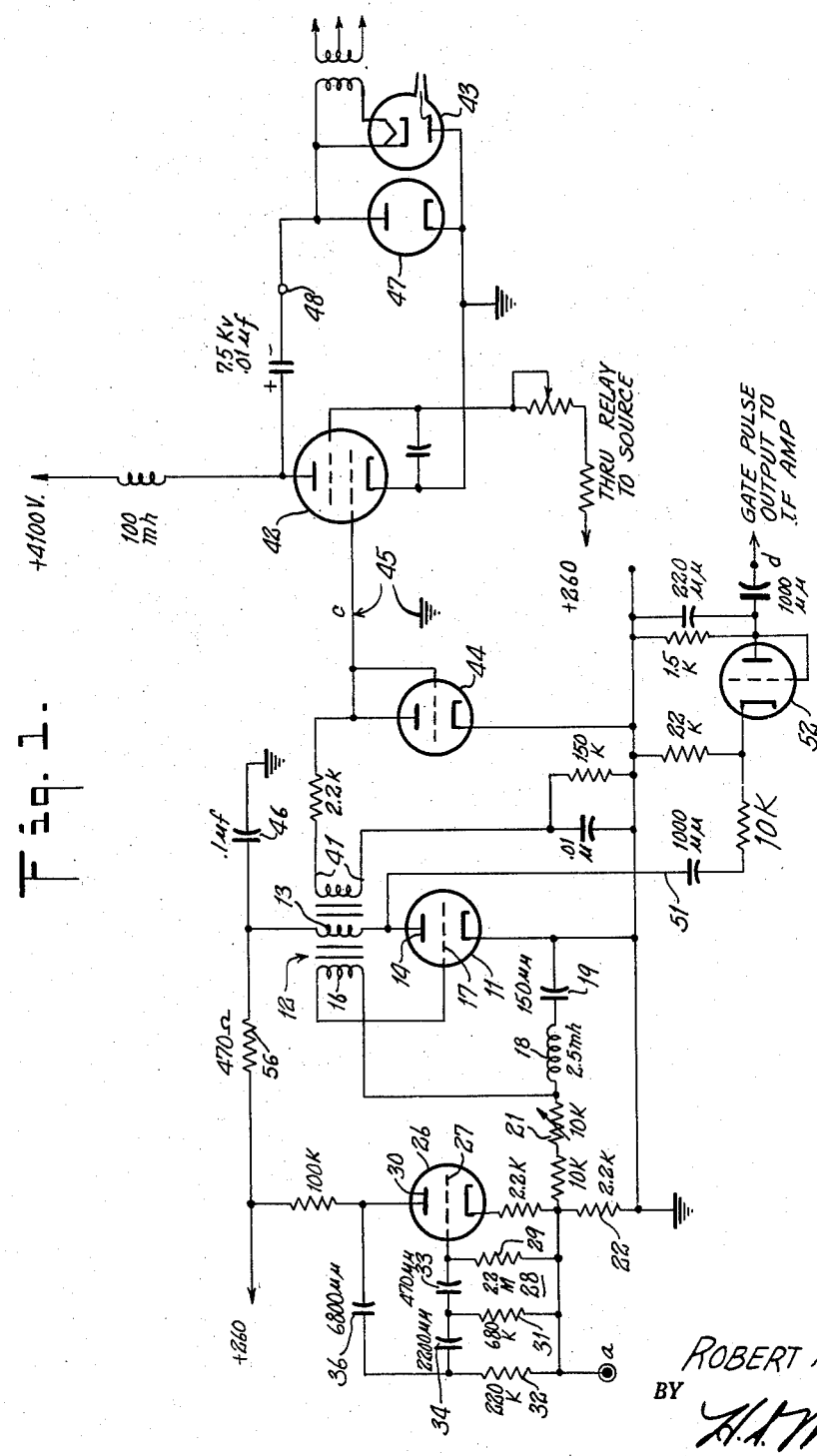
INVENTOR.
ROBERT A. FLOWER
BY
*H. A. Mackey*
ATTORNEY May 19, 1959  R. A. FLOWER  2,887,579
PULSE REPETITION FREQUENCY GENERATOR AND DRIVER
Filed Nov. 19, 1953  2 Sheets-Sheet 2
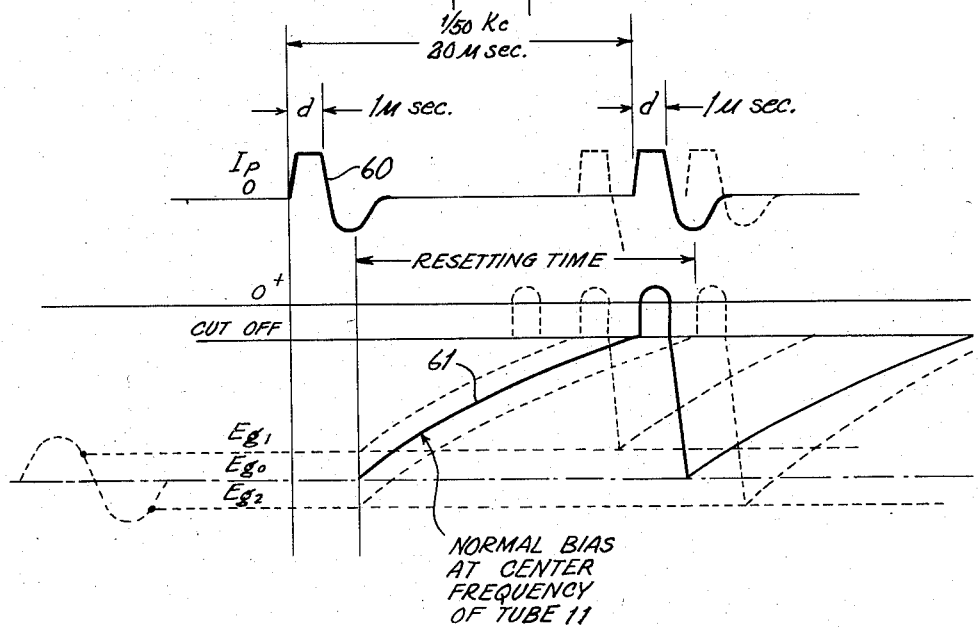
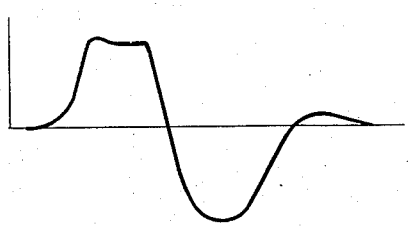
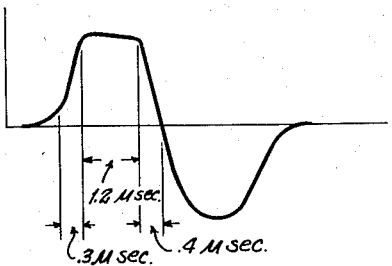
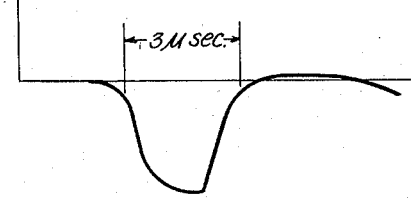
INVENTOR.
ROBERT A. FLOWER
BY
ATTORNEY United States Patent Office 2,887,579
Patented May 19, 1959

2,887,579

PULSE REPETITION FREQUENCY GENERATOR AND DRIVER

Robert A. Flower, White Plains, N.Y., assignor to General Precision Laboratory Incorporated, a corporation of New York Application November 19, 1953, Serial No. 393,043

3 Claims. (Cl. 250—36)

This invention relates to a generator of pulsed electrical energy and particularly to an improved pulse repetition frequency generator and driver for pulsing a generator of microwave energy. The embodiment of the invention described is especially adapted for use in radio-echo distance, and speed measuring systems where microwave energy is transmitted toward and reflected from the earth's surface.

However, it should be obvious that the invention is readily applicable to any situation where the pulse repetition frequency desired is within the range of the device which can nbe effected by appropriate selection of parameters.

In a pulsed radio-echo system of the type mentioned there is an inherent close coupling between the transmitter and receiver components and therefore since it is impractical to have the receiver and transmitter operating at the same time a single antenna system is usually used for both components with means being provided for making the receiver insensitive during periods of transmission. As a practical matter it is necessary to make the receiver insensitive for an appreciable interval both before and after the interval of transmission. Should the conditions be such that the radio frequency echoes reach the receiver during all or any part of the interval of its insensitivity, its useful signal power is reduced. The effective power received from an echo whose propagation time from the transmitter to the earth and back to the receiver is very short, or is a multiple of the pulse repetition period, is therefore either zero or very greatly reduced. This phenomena is called the "altitude hole" effect.

In the type of radio-echo systems mentioned, the transmitted pulse is not reflected as a single echo pulse but as a multitude of echoes of random magnitude and phase.

Furthermore, the power distribution in the echo pulse is not the same as in the transmitted pulse. For these reasons much of the echo power may be ineffective because it does not have the optimum phase with the periods of receiver sensitivity. Since the total effective echo signal power incident upon the receiver at a specific time is the linear summation of the power from all the echoes received the signal-to-noise ratio in the receiver is adversely affected if there is no echo signal energy available during the intervals when the receiver is made sensitive.

The above problem may be partially solved by frequency modulating or "wobbling" the pulse repetition frequency and accurately controlling the width of the transmitted pulse and the gating of the receiver.

The primary object of the present invention is to provide an improved repetition rate generator and driver capable of producing sharp voltage pulses whose frequency and width can be accurately controlled.

Another object is to provide an improved oscillator whose repetition rate can be readily and accurately controlled so as to avoid the "altitude hole" effect and at the same time to avoid frequencies which would interfere with the returned echo pulses or which would produce false indications.

In accordance with the invention a modified free-running line-controlled blocking oscillator is combined with a phase-shift oscillator.

Single-swing blocking and line-controlled blocking oscillators are well known in the art. The single-swing oscillation is not capable of producing an accurately shaped pulse and the usual line-controlled oscillator requires a separate source of triggering voltage. If the pulse repetition rate and pulse width are to be varied, as here, this entails further variable control means.

Another object is to provide an improved and simplified pulse repetition rate master oscillator and driver that does not need external triggering pulses.

Another object is to provide an improved pulse repetition rate master oscillator and driver in which the pulse width is determined by a simple L-C network and in which the pulse repetition rate may be variably controlled by an R-C network which includes the capacitance in the L-C network.

A still further object is to provide a novel and improved combination wherein the desirable features of a single swing blocking oscillator are combined with those of a phase-shift oscillator whereby the latter modifies the bias on the blocking oscillator tube to determine the frequency of the recurrence of the operating condition of the blocking oscillator.

Other and further objects will become apparent from the following description when considered in connection with the accompanying drawings, in which:

Figure 1 is a circuit diagram illustrating the invention;

Figure 2 is a graphical representation of the operation of the invention; and

Figures 3, 4 and 5 are curves showing the waveform at different points in the circuit, explained hereinafter.

Referring to Fig. 1 the triode 11 is connected in a transformer-coupled oscillator circuit having such parameters as to provide a single-swing blocking oscillator. A triple winding transformer 12 has a primary 13 in the circuit of the plate 14. A secondary 16 is in the circuit of the grid 17, this circuit being completed through two parallel branches, one including an inductor 18 and a capacitor 19 to ground and the other including a variable resistor 21 and a fixed resistor 22. It will be noted that the resistor 22 is common to the grid circuit of the tube 11 and to the cathode circuit of the triode 26. The reasons for this arrangement will be apparent from the subsequent description. It will be apparent at this time, however, that there is close coupling between these two tubes and that any variation in the voltage drop across the resistor 22 due to cathode current of tube 26, will effect the bias of the grid 17 of the tube 11.

The circuit of the grid 27 of the tube 26 includes a three mesh phase-shift network 28. This network includes resistors 29, 31 and 32 and capacitors 33 and 34. Feedback coupling from the plate 30 of the tube 26 is provided by a capacitor 36.

The transformer 12 is provided with an output secondary 41 which supplies a pulse modulation voltage to a power amplifier-modulator 42, the output of which controls the modulation of microwave oscillator 43. A suitable shaping diode 44 is connected across the output secondary 41 for the purpose of shaping the output pulse at 45 as shown in Fig. 4. Similarly, diode 47 shapes the output pulse at 48.

In connection with the general explanation above, it was pointed out that where the same antenna is used for transmission and reception, it is necessary to provide a gate pulse to render the receiver insensitive in appropriate time phase relation with the transmitted pulse in order to produce the optimum conditions for receiving the maximum echo power. Accordingly, a gate pulse is taken from the plate 14 of the pulse repetition rate master oscillator triode 11 to control the intermediate frequency amplifier of the receiver. This pulse is supplied through the circuit 51 which includes a shaping diode 52, to give an output pulse as shown in Fig. 5.

As mentioned above, in order to avoid the "altitude hole" effect it is necessary that the echo time not be equal to the reciprocal of the pulse repetition frequency or multiples thereof. Also preferably the pulse repetition frequency is wobbled at such rate that it does not interfere with echo frequencies of interest or give any false indications within the range of operating altitudes. The coupling between the grid circuit of the master oscillator tube 11 and the cathode circuit of the phase-shift oscillator 26 accomplishes this wobbling of the pulse repetition rate of the tube 11, while the center frequency of the latter tube is determined by the R-C time constant of the capacitor 19 and the resistance in parallel with it, namely, the combined resistance of resistors 21 and 22. The value of the inductance 18 and the capacitor 19 constitute a one-section delay line which determines the pulse duration. This is graphically illustrated in Fig. 2, where the output plate current is shown by the curve 60 and the grid voltage is shown by the curve 61.

Referring again to the circuit diagram of Fig. 1, it will be apparent that the frequency of oscillation of the tube 11 can be varied by varying its basic grid bias potential as well as by varying the R-C time constant of the grid circuit as determined by the capacitor 19 and the sum of the values of resistors 21 and 22. The bias potential will vary in response to a variation in the potential drop across the resistor 22 due to cathode current of triode 26. The interval during which the bias on the grid 17 of the tube 11 is above cutoff, determines the pulse width which is indicated at d in Fig. 2.

Oscillations in an electron tube are fundamentally alternations between a conducting and nonconducting condition. Since the conducting conditions of tube 11 are dependent upon the bias on the control grid 17 the frequency of oscillation depends upon the time necessary for the grid bias to go from below cutoff in a previous nonconducting condition to above cutoff. This can be effected by a self-biasing fixed R-C time constant such as that determined by the value of the capacitor 19 and the resistors 21 and 22 or by an external biasing means such as the potential drop in the resistor due to cathode current of tube 26, or both. With a fixed R-C time constant such as that provided by the capacitor 19 and the resistors 21 and 22 the frequency of oscillation, that is, the rate of the recurrence of the operating condition depends upon the charging rate of the capacitor 19. The charging time or the resetting time interval is indicated by the distance between the ends of the curved portion of the solid line graph 61 in Fig. 2. The family of dotted graphs to the left of graph 61, Fig. 2, illustrates how the recurrence or resetting time can be varied by changing the maximum negative bias on the grid 17, thus changing the time interval required for the grid to attain a potential above cutoff indicated in Fig. 2.

The variation in the negative biasing potential, that is, the lower end of graph 61 is produced by the variation in potential drop across resistor 22 due to the variation in the cathode current of tube 26 resulting from its oscillating condition.

It will be obvious from Fig. 1 that as the plate current of triode 11 starts to flow a magnetic field is set up around the primary winding 13 of the transformer 12. This field builds from zero to a maximum in direct proportion to the plate current and induces a voltage in the grid winding 16 having a polarity that drives the grid 17 more and more positive as the plate current increases. When the grid 17 becomes positive with respect to its cathode, the grid current causes accumulation of electrons on the plate of the capacitor 19 connected to the grid 17.

Not by way of limitation, but merely as an illustration, the parameters of the grid circuit of the tube 11 are such that the center oscillating frequency is 50 kilocycles per second while the parameters of the oscillating circuit of the tube 26 are such that the latter oscillates at approximately 55 cycles per second. The 55 kilocycle oscillations in the cathode current of the tube 26 through the resistor 22 varies the bias of grid 17 of the tube 11, accordingly to thereby frequency modulate the output of the tube 11.

In the embodiment illustrated the output of the phase-shift oscillator 26 is cathode-coupled to the grid circuit of the blocking oscillator 11 but if desired the coupling may be effected through the anode circuit of tube 26. In the latter event, the resistor 22 could be inserted in the anode circuit of the tube 26 between the 100K resistor 56 and the positive plate voltage.

The resistor 56 and the capacitor 46 serve as a decoupling stage to isolate the alternating current components of the plate circuits of tubes 11 and 26.

What is claimed is:

1. A pulse generator comprising, a discharge tube having an anode, cathode and control electrode, a transformer primary connected between said anode and a source of positive potential, a transformer secondary coupled to said primary having one terminal thereof connected to said control electrode, an inductance and capacitance connected in series between the other terminal of said secondary and said cathode, said secondary being so poled as respects said primary as to provide a positive feedback coupling between said anode and control electrode, a resistor network connected across said inductance and capacitance, and means connected to said resistor network for producing a variable potential drop across at least a portion thereof.

2. A pulse generator comprising, a discharge tube having an anode, cathode and control electrode, a transformer primary connected between said anode and a source of positive potential, a transformer secondary coupled to said primary having one terminal thereof connected to said control electrode, an inductance and capacitance connected in series between the other terminal of said secondary and said cathode, said secondary being so poled as respects said primary as to provide a positive feedback coupling between said anode and control electrode, a resistor network connected across said inductance and capacitance, an oscillator producing an alternating current output signal, and means connecting at least a portion of said resistor network in the output of said oscillator.

3. A pulse generator comprising, a discharge tube having an anode, cathode and control electrode, a transformer primary connected between said anode and a source of positive potential, a transformer secondary coupled to said primary having one terminal thereof connected to said control electrode, an inductance and capacitance connected in series between the other terminal of said secondary and said cathode, said secondary being so poled as respects said primary as to provide a positive feedback coupling between said anode and control electrode, a resistor network connected across said inductance and capacitance, a second discharge tube having a cathode circuit including a portion of said resistor network, and circuit means connected to said second discharge tube for rendering it self-oscillatory.

(References on following page)

References Cited in the file of this patent

UNITED STATES PATENTS

| | | |
|---|---|---|
| 2,437,970 | Reich | Mar. 16, 1948 |
| 2,445,662 | Davie | July 20, 1948 |
| 2,470,027 | Goldberg | May 10, 1949 |
| 2,531,301 | Scholten | Nov. 21, 1950 |
| 2,540,876 | Hansell | Feb. 6, 1951 |
| 2,564,000 | Gaffney | Aug. 14, 1951 |
| 2,564,687 | Guenther | Aug. 21, 1951 |
| 2,573,284 | Shaw | Oct. 30, 1951 |

OTHER REFERENCES

Radar Electronic Fundamentals, NAVships 900,016, June 1944, page 217.